Jan. 5, 1932.  A. E. L. CHORLTON  1,839,915
REMOTE CONTROL APPARATUS
Filed Feb. 25, 1928   5 Sheets-Sheet 1
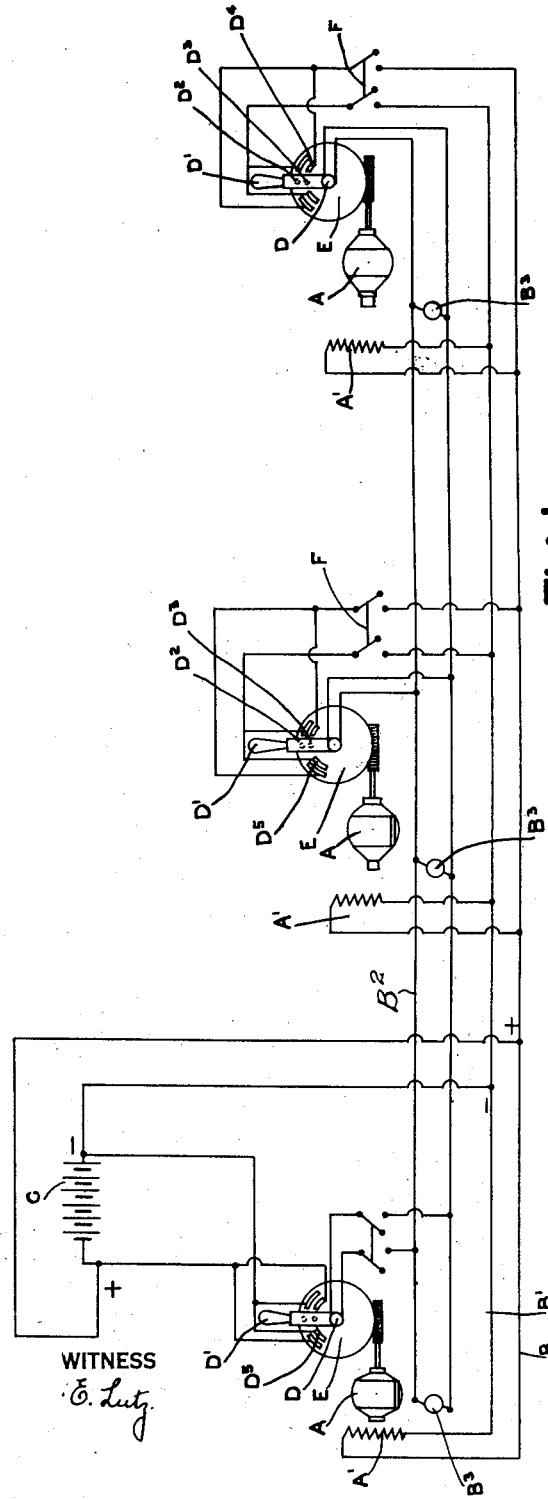
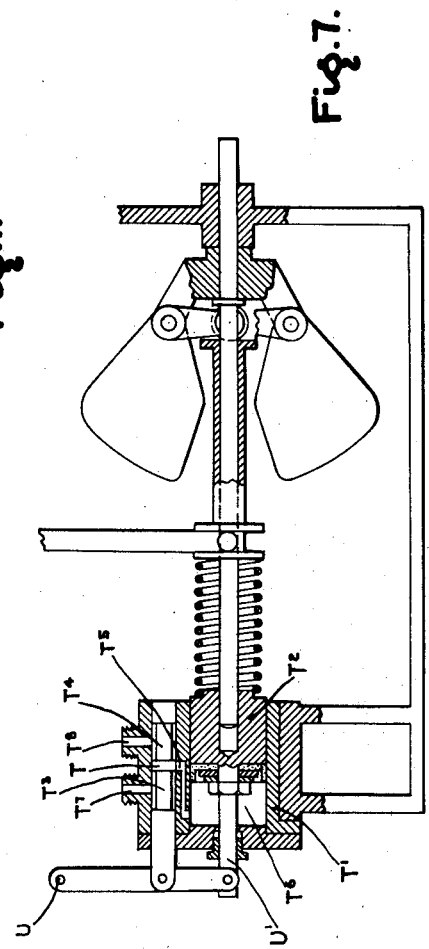
WITNESS
E. Lutz
INVENTOR
A.E.L.Chorlton
BY
a. B. Reavis
ATTORNEY Jan. 5, 1932.  A. E. L. CHORLTON  1,839,915
REMOTE CONTROL APPARATUS
Filed Feb. 25, 1928    5 Sheets-Sheet 2
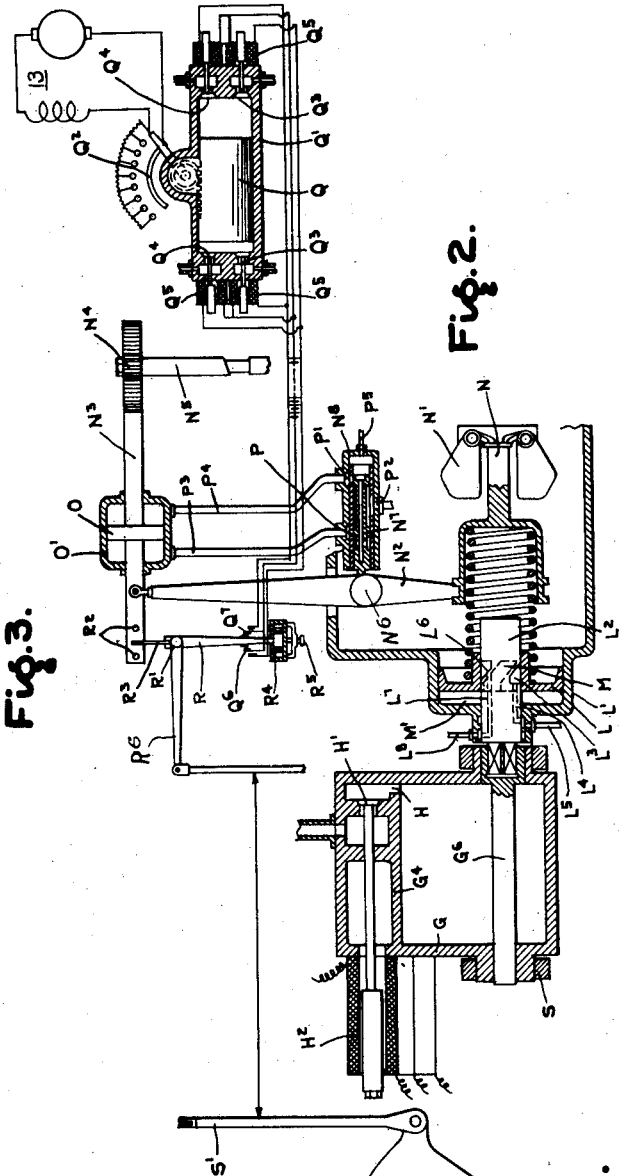
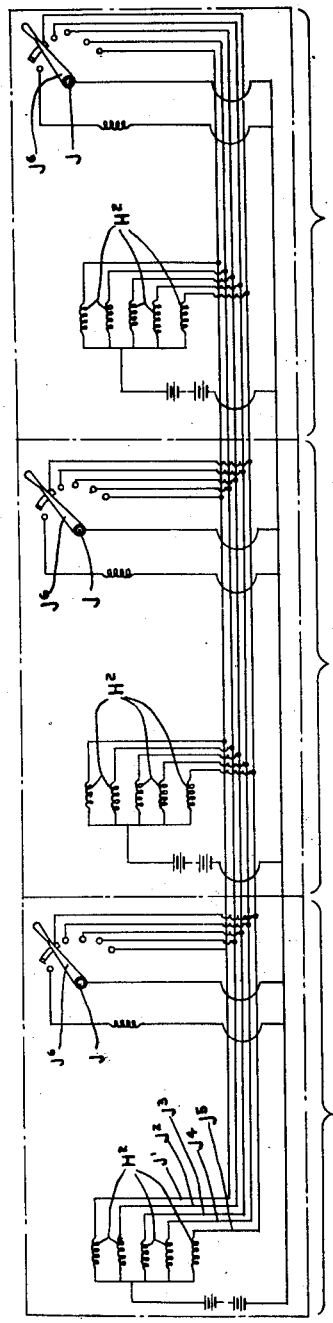
WITNESS
E. Lutz
INVENTOR
A.E.L.Chorlton
BY
a. B. Reavis
ATTORNEY

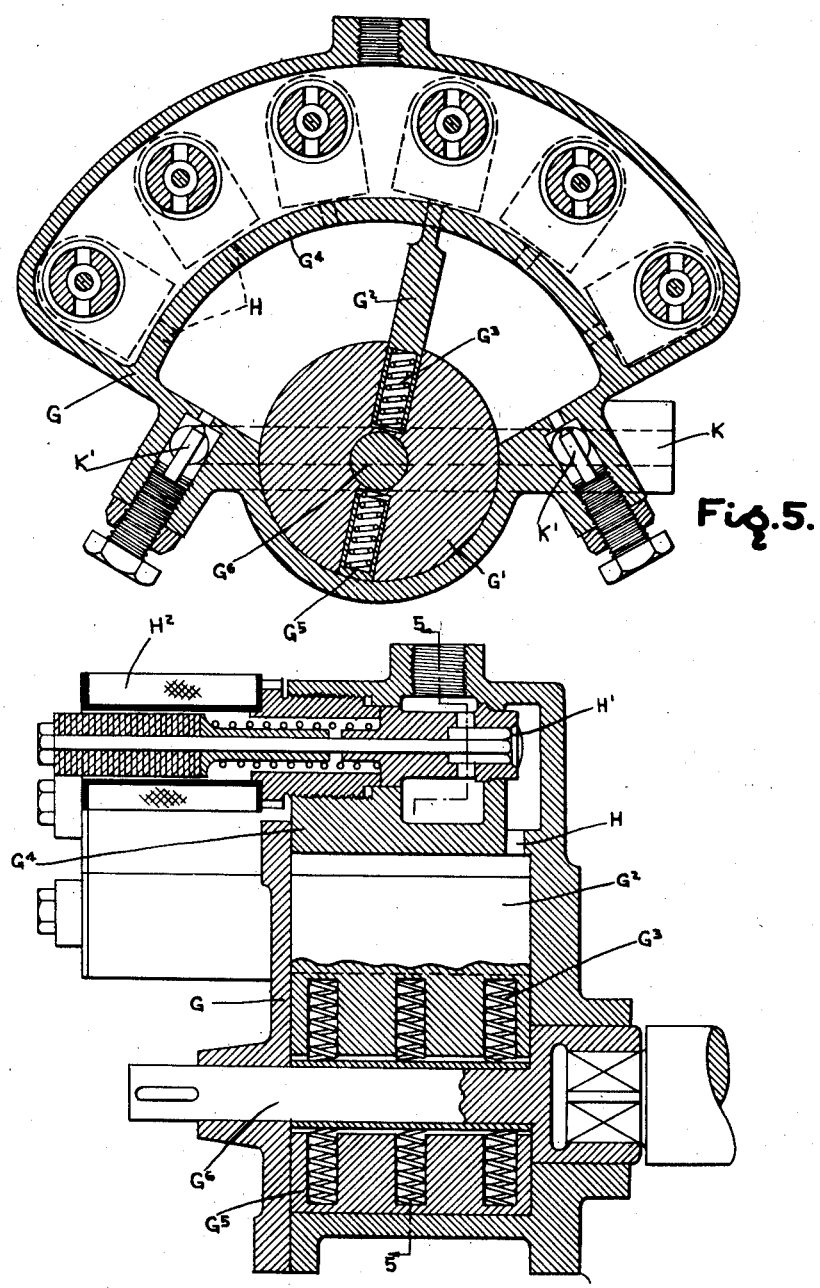

Patented Jan. 5, 1932

1,839,915

UNITED STATES PATENT OFFICE

ALAN ERNEST LEOFRIC CHORLTON, OF LONDON, ENGLAND

REMOTE CONTROL APPARATUS

Application filed February 25, 1928, Serial No. 257,073, and in Great Britain February 25, 1927.

My invention relates to rail motor transport apparatus of the type in which the motive power is derived from one or more prime movers mounted on one or more vehicles each of such prime movers being an internal combustion engine operating with airless fuel injection on the compression ignition cycle and my invention has for its object to enable such apparatus to be arranged and controlled in accordance with varying requirements with respect to load and speed.

In accordance with my invention two or more self contained power units are provided each being mounted on a separate and separately usable car and comprising an internal combustion engine operating with airless fuel injection on the compression ignition cycle and running under variable speed constant torque conditions, and with this apparatus is combined means for controlling from a single point on one of the power unit cars synchronously and simultaneously the speed and power output of all the separate engines. Thus each of a number of transport power units may comprise one or more rail cars, an internal combustion engine of the type indicated constituting the prime mover of an electric generating set mounted on one of these cars with electric motors transmitting the drive to some or all of the track wheels of one or more of the cars comprised in the transport power unit. Two or more of such transport power units may be coupled together by suitable means. A control point is associated with the engine of each power unit so that by means of suitable apparatus the speed and power output of the engine of the power unit with which this control point is associated can be controlled and when two or more of these power units are coupled together it is possible to control simultaneously from any one of the said control points the engines of all the coupled power units.

The control of each engine is effected by varying the supply of fuel delivered to the engine and the timing of the fuel injection into the engine cylinders, these variations being performed mechanically and preferably through a fluid pressure or other relay by a governor which itself is capable of adjustment by suitable means and in accordance with requirements. The speed of the engine determines the point at which current will commence to flow to the motors so that until the engine speed rises above a predetermined figure motive power will not be applied to the track wheels and thereafter the tractive effort is determined by adjustment of the engine speed. Each engine governor control device may be operable by hand so that the control point on any transport power unit may serve as what may be termed a primary or master control with respect to several coupled transport power units, the control devices associated with the engines of all the other power units being then actuated simultaneously from that one point which has been selected as the primary control. Thus while any one of the transport power units may on occasion be used by itself, on the other hand two or more of these same transport power units can be coupled together in order to make up the necessary length of train, when the prime movers on all these coupled units may then be controlled from a single primary or master control point selected in accordance with requirements.

The means by which the actuation of each control apparatus may be effected synchronously and simultaneously from the primary control point may vary, electric, hydraulic or pneumatic power being used for this purpose while the actual control device situated at each control point may be modified in accordance with the means employed for effecting the simultaneous control.

Thus, for example, servo-motors operated hydraulically or pneumatically may be employed to actuate the several control devices. These servo-motors are arranged to effect in some convenient manner the adjustment of the engine governor, by means of which in turn the power output of each engine is regulated. Again electric follow-up apparatus may be used in conjunction with electric motors which actuate the several governor control devices.

The invention may be carried into practice in various ways but three alternative arrangements according to this invention are illustrated somewhat diagrammatically by way of example in the accompanying drawings, in which:

Fig. 1 is a diagrammatic illustration of one arrangement employing electric follow-up apparatus;

Fig. 2 is a diagrammatic illustration of an alternative form of apparatus employing a pneumatic or hydraulic relay device electrically controlled;

Fig. 3 is a diagram showing the electric circuits employed for the control of the apparatus shown in Fig. 2;

Fig. 4 is a sectional side elevation on an enlarged scale of the electrically controlled pneumatic or hydraulic servo-motor employed in the construction shown in Fig. 2;

Fig. 5 is a section on the line 5—5 of Fig. 4;

Fig. 6 is an end elevation of part of the apparatus shown in Fig. 5;

Fig. 7 is a sectional side elevation of an alternative construction of fluid pressure operated mechanism for controlling the governor of an internal combustion engine with which is associated apparatus such as that shown in Fig. 2;

Figure 9:
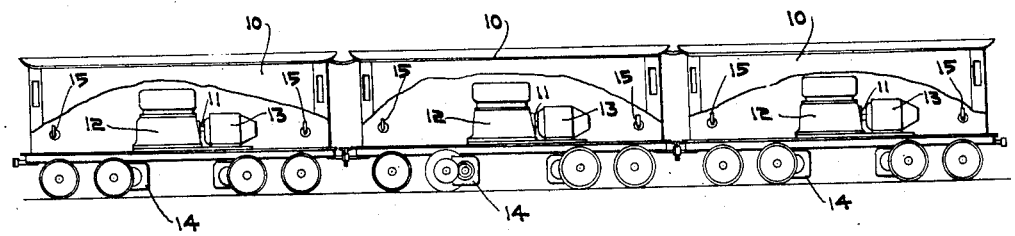
Fig. 9 is a diagrammatic view of one form of rail motor transport apparatus to which my control system may be applied; and, Fig. 10 is a detail view, partly in section and partly in elevation, of one of the internal combustion engines of the rail motor transport apparatus, which engine is equipped with one form of fuel system to which my control system may be applied.

The control apparatus diagrammatically illustrated in Fig. 1 is for a rail motor transport apparatus such as shown, by way of example, in Fig. 9. Referring to the latter figure, I show a plurality of coupled railway vehicles 10—10 each provided with a power unit 11. The power units 11 each comprise an internal combustion engine 12 of the compression ignition type and an electric generator 13 driven thereby. Suitable electric driving motors 14 receive their energy from the generators 13 and serve to propel the vehicles, all as is well understood in the art. Provided on each vehicle is a control station 15 for manipulating the control system to which my invention relates. Referring now to Fig. 1, each engine 12 has associated therewith an electric control motor diagrammatically shown at A, such motor being adapted, for example, to move the abutment for the governor spring either directly or through a hydraulic or pneumatic relay so as to vary the speed and power output of the engine. The electric motors may be of various types, for example shunt or compound wound, but in the example shown are shunt wound and their field circuits A¹ are connected in parallel by conductors B, B¹ and are continuously excited for example by current derived from a battery C or other source of current. The circuits B² of the motor armatures B³ are also connected in parallel as shown and a controller switch D associated with each motor is provided whereby the armature circuit B² of all the motors can be excited simultaneously when it is desired to bring the motors into operation to control the governors or the like and thus vary the speed and power output of all the engines. Each control switch D comprises a switch arm or its equivalent D¹ carrying one set of contacts D², D³ adapted to be moved from a neutral position as shown in the drawings into contact with either of two other sets of contacts D⁴, D⁵ carried by a rotatable disc E, these other contacts being respectively for causing the motors to rotate in one direction or the other.

Each disc E is adapted to be driven by the electric motor A which controls the governor with which the controller switch is associated so that when any switch is closed, all the motors wil be caused to operate and will continue to adjust their respective governor mechanisms until the disc driven by the motor associated with the controller switch which has been closed has been rotated to an extent sufficient to move the contacts thereon out of contact with those on the switch arm, whereupon all the motors will simultaneously stop. In order that only the controller switch which is actually being employed shall be operative and the circuits of the other switches shall be dead, additional switches F are provided in the circuit of each controller switch. Thus in operation the switch F associated with the controller switch which is to be employed is closed, the other switches F being open, so that the making of contact of the contacts on the inoperative controller arms when the discs associated with these controller arms rotate will be ineffective.

In the alternative arrangement illustrated in Figs. 2, 3, 4 and 5 electromagnetically or hydraulically operated control mechanism is employed. In this arrangement each governor is controlled either directly or as shown through a relay by means of a device comprising a substantially sector shaped casing G in which is mounted a drum or hub G¹ which makes contact over a portion of its circumference with the casing G and carries a radially disposed vane G² mounted to slide in a slot therein, this vane G² being pressed outwards by one or more springs G³ so that its outer edge makes substantially fluid-tight contact with the circumferential wall G⁴ of the casing G. A second subsidiary radial vane $G^5$ may also be provided to make fluid-tight contact between the drum and the portion of the casing with which it directly engages. Means are provided whereby fluid under pressure can be delivered constantly to the interior of the casing G on each side of the main vane $G^2$ and for relieving this pressure on either side thereof so as to cause movement of this vane and hence of the drum in which it is mounted whereby the governor can be adjusted. To this end the circumferential wall of the casing is provided with a series of relief outlets H of such size and so situated that each outlet will be closed by the outer edge of the main vane $G^2$ as the vane passes over it. Each of these outlets H is controlled by a valve conveniently of the poppet type as shown at $H^1$ mounted in the casing and each of these valves is adapted to be operated by a solenoid or the like $H^2$, diagrammatically shown also in Fig. 3. An electric control for these solenoids in provided whereby the corresponding solenoids in the control devices of all the engines can be energized simultaneously by the operation of any one of a number of master control switches shown at J and each associated with one of the engines. To this end each solenoid is conveniently arranged in an electric circuit $J^1$, $J^2$, $J^3$, $J^4$, $J^5$ which is common also to the corresponding solenoids in each and all of the control devices as shown in Fig. 3 in which the circuits for controlling simultaneously three power units according to this invention are shown.

Each master control switch J conveniently comprises a contact arm $J^6$ adapted to be moved over a series of contact points so arranged that a different solenoid circuit is closed when the contact arm $J^6$ is moved into contact with each contact point. In this way since, as shown, the corresponding solenoids in each control device are arranged in one circuit, a corresponding valve $H^1$ in each of the control devices is opened when the contact arm of the master controller is brought into contact with any one of the contact points. Thus by bringing the contact arm into engagement with different contact points different corresponding valves $H^1$ in the control devices will be opened and the position of the control devices and hence the speed and power output of all the engines controlled thereby will be simultaneously and similarly varied.

The operation of each control device is as follows.

Fluid under pressure is delivered continuously and at the same pressure to each side of the vanes through a passage K, needle valves $K^1$ or the like being provided to control the rate at which this pressure can build up on each side of the vane. As long as all the solenoid-operated poppet valves $H^1$ are closed, no movement takes place of the vane and the drum which carries it since the pressure on each side thereof is the same. If one of the poppet valves $H^1$ is opened however, the pressure on the side of the vane on which the outlet H controlled by such poppet valve is situated, is relieved and the vane will move under the pressure of the fluid on the other side thereof until the outer edge of the vane covers the outlet H, whereupon the pressure on the two sides of the vane will again become equal and the movement of the vane $G^2$ and the drum $G^1$ will cease. In this way by causing different poppet valves $H^1$ to be opened, the vane $G^2$ and hence the drum $G^1$ on which it is mounted, can be caused to take up various positions. Since, as described above, the vanes of all the control devices are simultaneously caused to move in synchronism by the operation of one of the master controllers, the governors of all the engines will be simultaneously and similarly adjusted and the speed and power output of all the engines thus similarly controlled. Each governor is conveniently controlled by moving the abutment for its spring and this may be effected by making this abutment in the form of a piston as shown at L the position of which in its cylinder $L^1$ is controlled by fluid admitted through a pilot valve $L^2$ controlled by the hydraulically operated governor control device above described. In the construction shown the pilot valve is of the rotary type and operates within a suitable bore in the piston L as shown, this valve being directly connected to the spindle $G^6$ of the hub $G^1$ whereby movement of this hub is transmitted directly to the pilot valve. The pilot valve $L^2$ may be arranged to control the flow of fluid into and out of the cylinder $L^1$ in various ways but in the form shown is provided with a fluid pressure inlet port $L^3$ communicating through a passage $L^4$ with an inlet pipe $L^5$ and a fluid pressure outlet port $L^6$ communicating through an outlet passage $L^7$ with an outlet pipe $L^8$. The bore in the abutment piston L within which the pilot valve operates is provided with a port or passage M indicated in chain line in Fig. 2 communicating with the pressure chamber $M^1$. The arrangement is such that when the pilot valve rotates in one direction the fluid pressure inlet port $L^3$ communicates through the passage M with the pressure chamber $M^1$ so as to cause the piston to move to the right in Fig. 2, while when the pilot valve rotates in the opposite direction the outlet port $L^6$ is placed in communication with the pressure chamber $M^1$ through the port M thereby permitting the abutment piston to move to the left. It will be seen that as soon as the abutment piston has moved a distance corresponding to the rotation of the pilot valve, the port M will cease to communicate with either the inlet or the outlet passage and movement of the piston will thus cease.

Figure 10:
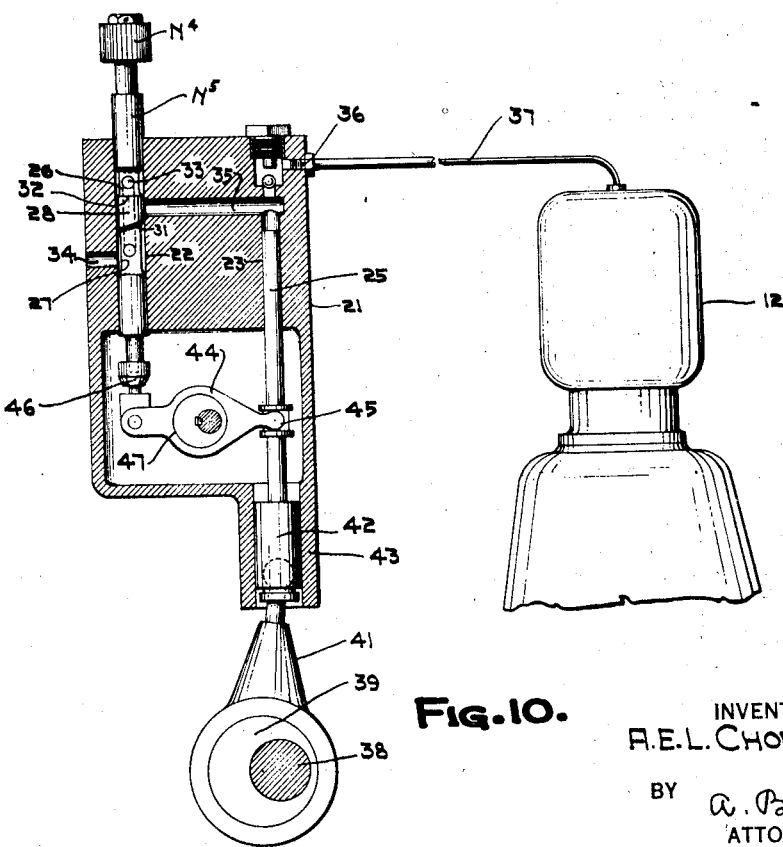

The movement of the governor may be transmitted to the mechanism for controlling the quantity of fuel injected into the engine cylinders in various ways. One form which may be applied to fuel injection apparatus of the kind described in the specifications of the present applicant's British Patents Nos. 248,016, 248,017 and 248,427, is however, shown in Fig. 2. In this arrangement the movable sleeve N controlled by the governor weights $N^1$ acts on one end of a lever $N^2$ the other end of which acts on a rack $N^3$ engaging a pinion $N^4$ whereby the valve $N^5$ controlling the fuel injection into the cylinders can be rotated so as to vary the quantity of fuel injected in the manner illustrated in Fig. 10. Referring to the latter figure, I show, by way of example, a form of fuel system to which my invention may be applied. The fuel system illustrated embodies a pump block 21 provided with parallel, spaced bores 22 and 23 for the fuel valve $N^5$ and a fuel pump plunger 25, respectively. The fuel valve $N^5$ is provided with reduced diametral portions 26 and 27 and an intervening valve face 28. The valve face 28 is provided with leading and trailing cut-off margins 31 and 32 and a passage 33 extends interiorly of the valve and affords communication between opposite sides of the cut-off margins of the valve face. Fuel is admitted to the pump block through an inlet 34 which communicates with the valve bore 22. The latter, in turn, communicates through a transverse passage 35 with the plunger bore 33. Relatively high pressure fuel is discharged from the pump block through an outlet 36 which is connected to the engine 12 by a suitable conduit 37.

The plunger 25 is reciprocated in the bore 33 by a drive shaft 38. The latter rotates in timed relation with the engine, all in a manner well understood in the art. The drive shaft 38 is provided with an eccentric 39 and an eccentric strap 41 connected to a crosshead 42. The latter reciprocates in a suitable guide structure 43 embodied in the pump block. It will, therefore, be apparent that the pump plunger 25 is reciprocated in the pump block in timed relation with the engine.

The valve $N^5$ is reciprocated in its bore 22 by means of a suitable lever 44. The latter is pivotally connected at one end to the pump plunger 25, as at 45, and is connected at its other end to the valve $N^5$ by means of a ball and socket joint 46. The lever 44 is provided with a fulcrum 47. It will, therefore, be apparent that reciprocatory movement of the plunger 25 effects a reciprocatory movement of the valve $N^5$ and that, when the plunger 25 is moving upwardly, the valve $N^5$ is moving downwardly and vice versa.

In operation, fuel is supplied to the inlet 34 and fills the valve bore 22, the passage 35, and the plunger bore 23. As the plunger moves upwardly on its working stroke, fuel is displaced from the chamber 23 and is discharged backwardly through the passage 35 and out through the inlet 34, the valve $N^5$, at this time, having its valve face 28 disposed above the passage 35. However, as the plunger moves upwardly and the valve moves downwardly, the leading cut-off margin 31 of the valve face reaches the lower edge of the passage 35 and renders the valve face 28 effective to block off the passage 35. At such times, fuel in the passage 35 and in the plunger bore 23 is trapped and the plunger 25 is rendered effective to discharge fuel at a relatively high pressure and rapid rate through the conduit 37 to the engine 12. Injection of fuel continues until such time as the trailing cut-off margin 32 of the valve face travels below the upper edge of the passage 35, at which time the pump plunger again displaces the fuel 23 backwardly through the passage 35 and the inlet 34. Thereafter, the plunger 25 proceeds downwardly on its non-working stroke while the valve moves in an upward direction and the interior passageways of the pump block are again filled with fuel after which the working stroke may again be repeated.

In order to vary the quantity of fuel injected into the engine cylinder as required by changes in load on the engine, the leading cut-off margin 31 of the valve is inclined with respect to the trailing cut-off margin 32 so that, by angular adjustment of the valve member $N^5$, the length of valve face which is effective to block off the passage 35 may be lengthened or shortened. In other words, in the angular position shown, a minimum amount of fuel is injected into the engine cylinder. However, by rotating the valve 24 approximately 180°, maximum fuel injection takes place.

It will, therefore, be apparent that movement of the rack $N^3$ effects a turning movement of the pinion $N^4$ which, in turn, adjusts the angular position of the valve $N^5$, such angular movement being permitted by the ball and socket joint 46 which retains the valve in operative connection with the lever 44.

The lever $N^2$ may be mounted so as to act directly on the rack but preferably, as shown in Fig. 2 of the drawings, is formed as a floating lever adapted to act on the rack $N^3$ through a fluid pressure relay. This relay conveniently comprises a piston O disposed in a cylinder $O^1$ closed at both ends and connected to the rack as shown, means being provided for delivering fluid under pressure to the cylinder so as to act on the piston to move it in the desired manner. To this end the lever $N^2$ is conveniently connected at $N^6$ to a pilot valve $N^7$ operating within a cylinder $N^8$ provided with three ports P, $P^1$, $P^2$, the ports P and $P^1$ communicating respectively through pipes P³, P⁴ with the two ends of the cylinder O¹ while the port P² communicates with a source of fluid pressure. The piston valve is so arranged that in its normal position of equilibrium it closes both the ports P and P¹, while if it is moved in either direction from such a position it establishes communication between one of the ports P, P¹ and the port P² and between the other port and an outlet passage P⁵, thus admitting fluid under pressure to one end of the cylinder O¹ and at the same time permitting the escape of fluid from the other end thereof, thus causing movement of the piston O. This movement in turn causes movement of the rack N³ thus causing also a movement of the lever N² so as to return the piston valve N⁷ to its normal position of equilibrium. It will thus be seen that any movement of the lever N² due to a movement of the governor will result in a corresponding movement of the piston O controlling the rack N³ whereby the fuel injected into the cylinders of the internal combustion engine is varied.

Mechanism is preferably provided whereby if the engine speed decreases beyond a certain limit a resistance is automatically introduced into the field circuit of the electric generator driven thereby so as to reduce the load on the engine and thus obviate risk of stalling or overloading it. This mechanism conveniently comprises a piston Q disposed in a cylinder Q¹ which is closed at both ends, the movement of this piston being adapted to control a rheostat Q² for varying the resistances in the field circuit of the generator 13. Arranged in each end of the cylinder Q¹ are two poppet or other valves Q³, Q⁴ one of which Q³ controls the admission of fluid under pressure, while the other Q⁴ controls a fluid outlet. Each of these valves is adapted to be operated by a solenoid Q⁵, the solenoids for the fluid inlet valve Q³ at one end of the cylinder and for the outlet valve Q⁴ at the other end of the cylinder being controlled by a single switch Q⁶, Q⁷. The two switches are conveniently controlled by the movement of the rack so that if the rack moves in one direction beyond a certain limit due to the engine speed dropping below a certain point, one of these switches Q⁷ is closed while if the rack moves in the other direction beyond a certain limit due to the engine speed increasing beyond a certain point, the other switch Q⁶ will be closed. The switch which is closed when the engine speed drops below a certain point closes the circuit of the solenoids for opening the fluid pressure inlet valve Q³ at one end of the cylinder Q¹ and the outlet valve Q⁴ at the other end thereof so that the piston moves so as to operate the rheostat Q² and place an increased resistance in the field circuit of the generator and thus reduce the load on the engine. On the other hand the switch Q⁶ which is closed after the engine speed increases beyond a certain limit is adapted to close the circuit of the solenoids controlling the other two valves so that the rheostat is moved by the piston to decrease the resistance in the generator field circuit. In this way risk of stalling the engine is prevented and a balance provided between the power output of the engine and the load placed on it.

The two switches Q⁶, Q⁷ are preferably controlled by a common operating arm R pivoted at R¹, this arm being operated from the rack N³ through a lost motion device and a spring connection comprising in the construction shown two pins R² on the rack adapted to engage a leaf spring R³ on the lever R, the arrangement being such that normally both pins R² are out of engagement with the spring R³ and one or the other of these pins only comes into engagment with the spring after a predetermined movement of the rack N³. A dash-pot device R⁴ of the liquid type acting on the arm R is conveniently also provided to prevent the closing of either of the switches Q⁶, Q⁷ by sudden or irregular movements of the rack N³, the degree of lag introduced into the operation of the mechanism by the dash-pot R⁴ being controllable for example by a valve R⁵ controlling the flow of fluid from one end of the dash-pot cylinder to the other.

If desired, instead of the above mechanism for controlling the strength of the field of the generator in accordance with the engine speed, the spindle G⁶ of the vane-carrying drum G¹ may be extended through the end of the casing remote from the relay valve L² and may carry or be connected to an electric contact drum or rheostat which will effect the desired control of the generator field circuit.

Further, in some cases, the outer casing G of the electro-pneumatically or hydraulically operating control device shown, may be mounted in bearings S so as to be capable of rocking about an axis coincident with that of the spindle G⁶ so as to enable the position of the vane and hence the power output of the engine to be varied by rocking the casing. In such an arrangement rocking movement of the casing may be arranged to take place simultaneously with movement of the piston Q controlling the rheostat Q² and this may be effected either by providing a direct or indirect connection between this piston and the casing or, as indicated in Fig. 6, by providing a link connection S¹ between the casing G and a lever R⁶ rigidly connected to the operating arm R for the switches Q⁶, Q⁷. In either case the arrangement is preferably such that when the piston Q is moved so as to introduce greater resistance into the field circuit and thus decrease the field, the casing G may also be rocked so as to cause movement of the vane $G^2$ and drum $G^1$ to effect movement of the piston L to increase the effective strength of the governor spring and hence produce an increase in the output of the engine expressed in horsepower. Thus, when the speed of the engine drops due to the load imposed upon it being greater than the torque developed by the engine, not only is the load on the engine reduced by diminishing the field strength of the generator, but in certain cases the quantity of fuel supplied to the engine is simultaneously or subsequently automatically increased so as to increase the speed of the engine and hence also the resultant torque through the generator.

Instead of the fluid pressure relay illustrated in Fig. 2 for causing movement of the abutment for the governor spring as a result of movements of the vane-carrying drum $G^1$, the arrangement illustrated in Fig. 7 may be employed. In this arrangement a piston valve T is provided controlling the flow of fluid to and from a cylinder $T^1$ in which the governor abutment piston $T^2$ moves. To this end the body of the piston valve T is provided with two annular recesses $T^3$, $T^4$ one on either side of a central portion which fits closely within the chamber in which the valve operates and normally serves to close a transfer port $T^5$ communicating with the pressure space $T^6$ of the cylinder $T^1$. The two recesses $T^3$, $T^4$ always communicate respectively with an admission port $T^7$ for pressure fluid and a relief port $T^8$, the arrangement being such that movement of the valve T in one direction or the other brings the transfer port $T^5$ into communication either with the admission port $T^7$ or with the relief port $T^8$.

The stem of the piston valve T is connected to an intermediate point in a floating lever U, one end of which is connected to the abutment piston $T^2$ by means of a rod $U^1$ passing through the closed end of the cylinder $T^1$. The other end of the lever U is operatively connected to the control device for the engine, for example the spindle $G^6$ say through a link connected to a lever rigidly secured to this spindle. Thus when the spindle $G^6$ rocks, this movement is transmitted to the lever U which thus moves the piston valve T to control the flow of pressure fluid to or from the cylinder $T^1$ of the abutment piston $T^2$ and in this way vary the position of this piston and hence the effective strength of the governor spring.

Figure 8:
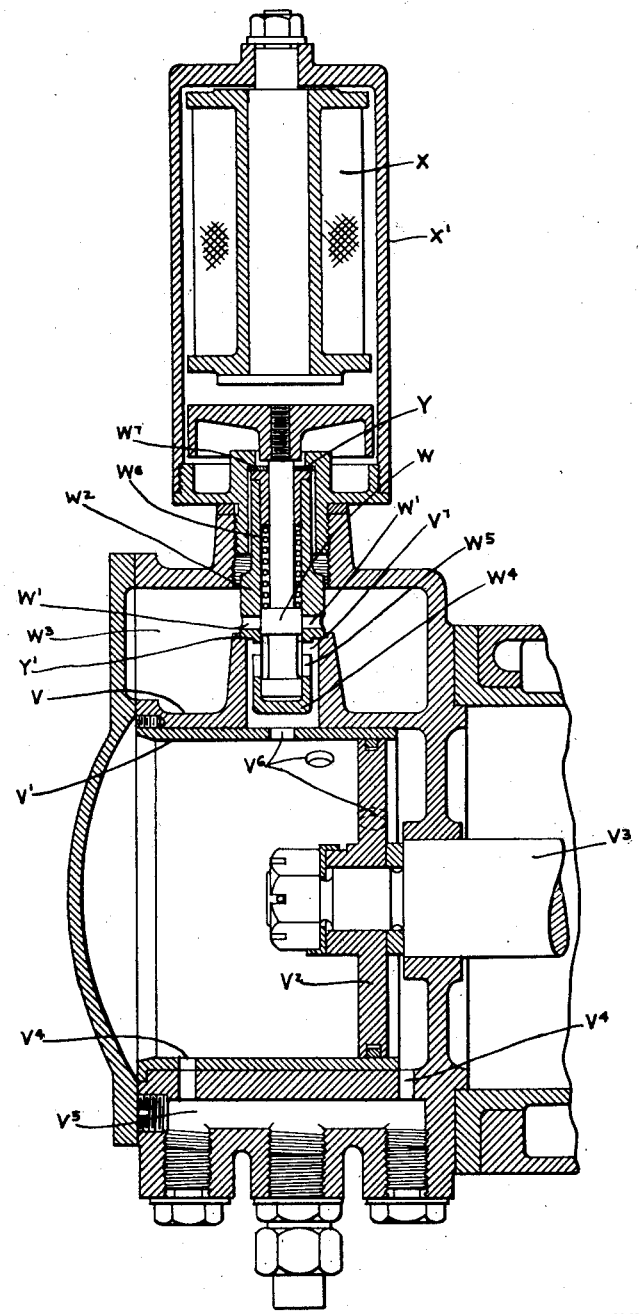
Fig. 8 is a sectional side elevation of an alternative form of electrically controlled pneumatic or hydraulic relay device which may be employed instead of that shown in Figs. 2, 4 and 5.

If desired instead of the electrically controlled pneumatic or hydraulic relay device shown in Figs. 2, 4 and 5, that shown in Fig. 8 may be employed. This device comprises a substantially cylindrical casing V provided with a liner $V^1$ within which moves a piston $V^2$ connected to the end of a piston rod $V^3$ passing through one end of the casing V. Fluid under pressure is admitted to each end of the cylinder V through ports $V^4$ from a common inlet passage $V^5$. A series of relief ports $V^6$ are provided in the casing displaced longitudinally and circumferentially from one another as shown and adapted to be covered by the edge of the piston $V^2$ as it passes over them. Each of these ports communicates with a chamber $V^7$ containing a valve W controlling an outlet passage $W^1$ in a member $W^2$ leading to a relief chamber $W^3$. Each valve W is controlled by a solenoid X disposed in a casing $X^1$, the solenoids X corresponding to the solenoids $H^2$ in the arrangement shown in Figs. 2, 4 and 5. Mounted on the lower end of the valve W is a cap $W^4$ which acts as a stop to limit the upward movement of the valve under the action of the solenoid and is provided with slots $W^5$ as shown to permit the passage of fluid through the valve when this cap is in contact with the member $W^2$. A coil spring $W^6$ acting at one end on the valve W and at the other end on an abutment sleeve $W^7$ serves normally to maintain the valve in its closed position. Washers Y, $Y^1$ serve to maintain fluid-tight joints between the abutment sleeve $W^7$ and the solenoid casing $X^1$ and between the member $W^2$ and the casing V.

With this arrangement it will be seen that normally the piston $V^2$ will remain stationary owing to the pressure on each side thereof being the same. When one of the relief ports $V^6$ is opened, however, by movement of the valve W due to the solenoid X being energized, the pressure on the side of the piston $V^2$ on which this port is at the time situated will be relieved and the piston will thus move under the action of the pressure on the other side thereof until its edge closes the relief port in question, when the pressure will again become equal on both sides of the piston and it will cease to move.

The device illustrated in Fig. 8 thus operates in a similar manner to that illustrated in Figs. 2, 4 and 5 except that the piston $V^2$ is moved longitudinally whereas the drum $G^2$ is rotated.

This longitudinal movement of the piston $V^2$ may be caused to control the internal combustion engine with which the device is associated in various ways. For example, the piston rod $V^3$ may itself carry or constitute the movable abutment for the governor spring or may act on the governor spring abutment through a suitable relay device, for example by being connected to the free end of the floating lever U of a relay device such as that illustrated in Fig. 7.

It is to be understood that the mechanism for transmitting the governor movements to the mechanism for controlling the internal combustion engine and the means for automatically varying the generator field in accordance with the engine speed illustrated in Fig. 2 may also be employed in conjunction with the relay device illustrated in Fig. 8 whether such device is combined with a relay device such as that shown in Fig. 7 or acts directly on the governor spring abutment.

It will be seen that with the apparatus illustrated Figs. 2, 3, 4, 5 and 6 when the internal combustion engine is idling, the switch $Q^7$ will be closed and the piston Q will thus move so as to cause the rheostat $Q^2$ to move to the left in Fig. 2 so as to place the maximum resistance in the field circuit of the generator. The field will thus be reduced to such an extent that the current generated will be insufficient to cause the motors to drive the track wheels. When one of the master control switches J is operated, however, to close one of the circuits $J^1$, $J^2$, $J^3$, $J^4$ or $J^5$, the solenoids $H^2$ in such circuit will be energized and will cause the corresponding valve $H^1$ in each and all of the control devices G to open thus causing all the drums $G^5$ to rotate through the same angle. The valves $L^2$ will thus be rotated to admit fluid under pressure to the cylinders $L^1$ so as to move the abutment pistons L a corresponding distance. The governor springs will thus be compressed and will cause movement of each governor sleeve N. Each sleeve $N^2$ will thus be actuated and through the relay valve $N^7$ and piston O will cause movement of the rack $N^3$ to rotate the valve $N^5$ so as to increase the quantity of fuel injected into the cylinders of the internal combustion engine.

The internal combustion engines in all the power units will thus be simultaneously speeded up and will thereby cause the generators connected thereto to deliver current to the motors sufficient to drive the track wheels. It will be seen that the greater the movement of the drum $G^5$, the greater will be the extent to which each governor spring is compressed and thus the greater the speed and power output of each internal combustion engine, increases in the speed of these engines being accompanied by an increase in the fields of the several generators owing to movement of the rheostat $Q^2$.

It will thus be seen that with the apparatus above described all the power units are simultaneously controlled by apparatus which initially acts solely to control the speed and power output of the several internal combustion engines, the necessary control of each generator field circuit being automatically effected in accordance with the speed variations of the internal combustion engines.

It is to be understood that the constructions described more particularly with reference to the drawings are given by way of example only and that the details of construction may be varied within wide limits without departing from my invention.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a power generating plant for rail motor transport purposes, the combination of a railway vehicle having an electric propulsion motor, a connected internal combustion engine and an electric generator carried by the vehicle for developing energy for utilization by the motor, said electric generator including a field circuit, a variable resistance connected in the field circuit of the generator, a fluid motor for adjusting the resistance, and an electric relay responsive to a predetermined change in the speed of the engine for controlling the fluid motor.

2. In a power generating plant for rail motor transport purposes, the combination of a plurality of railway vehicles having electric propulsion motors, connected internal combustion engines and electric generators carried by the vehicles for developing energy for utilization by the motors, a speed-responsive governor provided on each engine-generator, means responsive to a predetermined movement of the governor for changing the load imposed by its associated generator on the engine, a controller on each vehicle, speed-changer mechanism embodied in each governor, and means responsive to adjustment of any one controller for effecting corresponding and simultaneous adjustments of the governor speed changers.

3. In a power generating plant for rail motor transport purposes, the combination of a plurality of railway vehicles having electric propulsion motors, connected internal combustion engines and electric generators carried by the vehicles for developing energy for utilization by the motors, and means for controlling synchronously and simultaneously the speed and power output of the separate engines, said means including a plurality of members movable in response to fluid pressure so as to assume a series of positions, a series of independently operated fluid valves for controlling the positions of each of the movable members, a solenoid for operating each valve, a master control switch provided on each vehicle, and means responsive to adjustment of any one switch for selectively energizing corresponding solenoids of the movable members.

4. A power generating plant as claimed in claim 3 wherein the movable member embodies a sector-shaped casing having a circumferential wall, said circumferential wall being provided with a series of outlet openings, a shaft disposed in the casing, a radial vane mounted on the shaft and angularly movable with respect to the casing, means for admitting fluid under pressure to the casing on opposite sides of the vane, and a solenoid-operated valve for controlling each outlet opening, said vane being formed to close, respectively, the outlet openings when disposed in an angular position adjacent thereto.

5. A power generating plant as claimed in claim 3 wherein the movable member embodies a cylinder having a circumferential wall provided therein, said circumferential wall having a series of fluid outlet openings longitudinally displaced with respect to each other, a piston movable longitudinally in the cylinder, means for admitting fluid under pressure to the cylinder and on opposite sides of the piston, and a solenoid-operated valve for controlling each fluid outlet opening, said piston being formed to close, respectively, the outlet openings when disposed in a longitudinal position adjacent thereto.

6. In a power generating system, the combination of two or more coupled power units, each unit including an internal combustion engine, a speed governor for each engine and provided with an adjustable speed changer, fluid motors for adjusting the positions of the respective speed changers, a controller, and electro-magnetic means responsive to adjustments of the controller for effecting simultaneous and co-extensive movements of the fluid motors.

7. In a power generating system, the combination of two or more coupled power units, each unit including an internal combustion engine, a speed governor for each engine and provided with an adjustable speed changer, fluid motors for adjusting the positions of the respective speed changers, a controller associated with each power unit, and electro-magnetic means responsive to adjustment of any one controller for regulating the movements of the fluid motors.

8. In a power generating system, the combination of two or more coupled power units, each unit including an internal combustion engine, a speed governor for each engine and provided with an adjustable speed changer, fluid motors for adjusting the positions of the respective speed changers, a series of electro-magnetic elements associated with each of the aforesaid fluid motors for controlling the movements of the same, a controller, and means responsive to adjustments of the controller for altering the settings of selected and corresponding electro-magnets of each of the aforesaid fluid motors, whereby the positions of the several fluid motors may be correspondingly altered.

9. In a power generating system, the combination of two or more coupled power units, each unit including an internal combustion engine and an electric generator driven thereby, a speed governor for each engine and provided with an adjustable speed changer, a controller, means responsive to adjustment of the controller for regulating the settings of each of the aforesaid speed changers, and means responsive to predetermined changes in the speed of the engines for altering the field strength of their generators.

10. In a power generating system, the combination of two or more coupled power units, each unit including an internal combustion engine and an electric generator driven thereby, a speed governor for each engine and provided with an adjustable speed changer, a controller, means responsive to adjustment of the controller for regulating the settings of each of the aforesaid speed changers, and means responsive to predetermined movements of the speed governors for altering the field strength of the generators.

11. In a power generating system, the combination of two or more coupled power units, each unit including an internal combustion engine and an electric generator driven thereby, a speed governor for each engine and provided with an adjustable speed changer, a controller, means responsive to adjustment of the controller for regulating the settings of each of the aforesaid speed changers, and means responsive to predetermined movements of the governors resulting from a decrease in the speed of their engines for diminishing the field strength of their associated generators and vice versa.

12. In a power generating system, the combination of two or more coupled power units, each unit including an internal combustion engine and an electric generator driven thereby, said electric generator including a field circuit, a speed governor for each engine and provided with an adjustable speed changer, a controller, means responsive to adjustment of the controller for regulating the settings of each of the aforesaid speed changers, a variable resistance connected in the field circuit of each of the aforesaid generators, and means responsive to predetermined movements of the engine speed governors for adjusting the position of said resistance.

13. In a power generating system, the combination of two or more coupled power units, each unit including an internal combustion engine and an electric generator driven thereby, said electric generator including a field circuit, a speed governor for each engine and provided with an adjustable speed changer, a controller, means responsive to adjustment of the controller for regulating the settings of each of the aforesaid speed changers, a variable resistance connected in the field circuit of each of the aforesaid generators, a fluid motor for actuating the resistance, electro-magnetic means for controlling the movements of the fluid motor, and means responsive to movements of the speed governors for so energizing the electromagnetic means as to increase resistance in the field circuits of the generators upon a predetermined decrease in the speed of the engine and to decrease resistance in the field circuits of the generators upon a predetermined increase in the speed of the engine.

14. In a power generating system, the combination of an electric generator, an internal combustion engine for driving the generator, a speed governor for the engine, said governor having an adjustable speed changer, and means responsive to a predetermined change in the speed of the engine for altering the field strength of the generator and the setting of the governor speed changer.

15. In a power generating system, the combination of an electric generator, an internal combustion engine for driving the generator, a speed governor for the engine, said governor being provided with an adjustable speed changer, a controller, means responsive to adjustment of the controller for regulating the setting of the speed changer, means responsive to predetermined changes in the speed of the engine for altering the field strength of the generator, and means independent of the controller and responsive to predetermined changes in the speed of the engine for altering the setting of the governor speed changer.

16. In a power generating system, the combination of two or more coupled power units, each unit including an internal combustion engine and an electric generator driven thereby, a speed governor for each engine and provided with an adjustable speed changer, a controller, means responsive to adjustment of the controller for regulating the settings of each of the aforesaid speed changers, and means responsive to predetermined changes in the speeds of the engines for altering the field strength of their associated generators and the positions of their governor speed changers.

17. In a power generating system, the combination of an electric generator, an engine for driving the generator, a speed governor for the engine, said speed governor including an adjustable speed changer, a controller for adjusting the position of the speed changer, and means responsive to a predetermined decrease in the speed of the engine for decreasing the field strength of the generator and for adjusting the position of the governor speed changer independently of the controller to increase the speed of the engine, and vice versa.

18. In a power generating system, the combination of two or more coupled power units, each unit including an internal combustion engine and an electric generator driven thereby, a speed governor for each engine and provided with an adjustable speed changer, a controller associated with each power unit, means responsive to adjustment of any one controller for regulating the settings of each of the aforesaid speed changers, means responsive to predetermined changes in the speed of the engines for altering the field strength of their associated generators, and means responsive to predetermined movements of the engine governors for altering, independently of the controller, the settings of their speed changers.

In testimony whereof, I have hereunto subscribed my name this sixth day of February, 1928.

ALAN ERNEST LEOFRIC CHORLTON.